United States Patent
Bordonaro et al.

(10) Patent No.: US 8,014,510 B2
(45) Date of Patent: *Sep. 6, 2011

(54) ARRANGEMENT FOR CONTROLLING CONGESTION IN AN SS7 SIGNALING NODE BASED ON PACKET CLASSIFICATION

(75) Inventors: Frank G. Bordonaro, Cary, NC (US); Amitava Das, Chapel Hill, NC (US); Paul A. Schmidt, Cary, NC (US); Glenn D. Watson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1280 days.

This patent is subject to a terminal disclaimer.

(21) Appl. No.: 11/288,381

(22) Filed: Nov. 29, 2005

(65) Prior Publication Data

US 2006/0078008 A1    Apr. 13, 2006

Related U.S. Application Data

(63) Continuation of application No. 10/059,127, filed on Jan. 31, 2002, now Pat. No. 6,996,225.

(51) Int. Cl.
*H04M 7/00*    (2006.01)

(52) U.S. Cl. .......... 379/229; 379/220.01; 379/230; 370/352

(58) Field of Classification Search .......... 379/229, 379/229.01, 230
See application file for complete search history.

(56) References Cited

U.S. PATENT DOCUMENTS

| | | | |
|---|---|---|---|
| 5,450,483 A * | 9/1995 | Williams | 379/112.04 |
| 5,570,410 A | 10/1996 | Hooshiari | |
| 5,581,610 A * | 12/1996 | Hooshiari | 379/133 |
| 5,615,254 A | 3/1997 | Qiu et al. | |
| 5,778,057 A | 7/1998 | Atai | |
| 5,898,672 A | 4/1999 | Ginzboorg | |
| 6,018,519 A | 1/2000 | Ginzboorg | |
| 6,275,572 B1 | 8/2001 | Higuchi et al. | |
| 6,327,361 B1 | 12/2001 | Harshavardhana et al. | |
| 6,470,009 B1 * | 10/2002 | Christie et al. | 370/352 |
| 6,567,515 B1 | 5/2003 | Hosein | |
| 6,614,781 B1 * | 9/2003 | Elliott et al. | 370/352 |
| 6,614,894 B1 | 9/2003 | Brockman et al. | |
| 6,707,900 B1 * | 3/2004 | Jellema et al. | 379/221.08 |
| 6,748,063 B1 | 6/2004 | Hunt et al. | |
| 6,807,170 B1 * | 10/2004 | Dendi et al. | 370/354 |
| 2002/0191543 A1 * | 12/2002 | Buskirk et al. | 370/230.1 |
| 2003/0021230 A1 * | 1/2003 | Kuo et al. | 370/230 |
| 2003/0210686 A1 * | 11/2003 | Terrell et al. | 370/389 |

OTHER PUBLICATIONS

Koster, Gerta, Improving the Automatic congestion control in SS7-signaling network, Sep. 2000-Jan. 2001, Cokputer Network, p. 1-8.*
U.S. Appl. No. 10/022,443, filed Dec. 20, 2001, Dunn et al.

* cited by examiner

*Primary Examiner* — Curtis Kuntz
*Assistant Examiner* — Joseph J Nguyen
(74) *Attorney, Agent, or Firm* — Leon R. Turkevich

(57) ABSTRACT

A signaling network node is configured for identifying a received signaling message as belonging to one of a plurality of prescribed originating node groups, based on prescribed message class selection criteria. Each originating node group has at least one originating node and is assigned at least one congestion threshold relative to a message rate (e.g., messages per unit time or number of bytes per unit time). The signaling network node determines the message rate for each corresponding originating node group; if the message rate for an originating node group exceeds the corresponding at least one congestion threshold, the signaling network node outputs a congestion signaling message to the originating node having sent the signaling message, for reduction of the corresponding message rate.

36 Claims, 4 Drawing Sheets

| | |
|---|---|
| 38a | OPC Classification |
| 38b | DPC Classification |
| 38c | Service Indicator Classification |
| 38d | Subsystem Number Classification |
| 38e | Calling Party Address Class. |
| 38f | Called Party Address Class. |
| 38g | Selected MTP-3 Field Value Class. |
| 38h | SCCP: GTT Based Classification |
| 38i | SCCP: GTA Based Classification |
| 38j | User Selected Bit Pattern Class. |

Figure 3

| Msg. Class Key Key | Node Group | Thresholds | | | | Node Grp. | OPC | |
|---|---|---|---|---|---|---|---|---|
| | | T1 | T2 | A1 | A2 | | | |
| 123-000-XXX | A | 40 | 80 | 35 | 70 | A | 123-000-001 | 42a |
| | | | | | | A | 123-000-002 | 42b |
| 123-010-XXX | B | 50 | 60 | 40 | 50 | B | 123-010-110 | 42c |
| | | | | | | B | 123-010-510 | 42d |
| 215-XXX-XXX | C | 30 | 40 | 25 | 35 | C | 215-000-001 | 42e |

Figure 4

ARRANGEMENT FOR CONTROLLING CONGESTION IN AN SS7 SIGNALING NODE BASED ON PACKET CLASSIFICATION

This application is a continuation of application Ser. No. 10/059,127, filed Jan. 31, 2002 now U.S. Pat. No. 6,996,225.

BACKGROUND OF THE INVENTION

1. Field of the Invention

The present invention relates to controlling congestion in a Signaling System 7 (SS7) node of a Common Channel Interoffice Signaling (CCIS) network.

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

Congestion is one problem typically encountered by an outbound link of an SS7 signaling network node, where the SS7 signaling message traffic for the outbound link exceeds the maximum prescribed bandwidth (e.g., 64 kbps) for that outbound link. Existing SS7 protocols specify congestion control mechanisms used to alleviate the congestion encountered by an SS7 signaling network node. In particular, the American National Standards Institute (ANSI) and the International Telecommunication Union (ITU) each specify that congestion control can be accomplished by defining congestion onset and abatement thresholds as increasing percentages of the outbound link queue (see, e.g., ANSI T1.111 and ITU Q.704). For example, if a message signal unit (MSU) queued for transmission on the outbound link causes the buffer occupancy of the outbound link queue to increase beyond a given congestion onset threshold (e.g., congestion threshold "n"), then the outbound link is deemed by the SS7 signaling network node to have a congestion level "n". The SS7 signaling network node (i.e., the "congested node") in response sends a Transfer Controlled (TFC) message to the originator of the MSU (i.e., the "originating node") as identified by the originating point code, indicating the current congestion level.

The originating node, in response to receiving the TFC message: marks in its routing table that the destination point code assigned to the congested node has a congestion status "n"; stops outputting to the congested node MSUs having a priority less than the congestion status; and starts a routeset congestion test procedure including periodically sending a routeset congestion test (RCT) message to the destination point code of the congested node. If the congested node detects that the congestion condition persists in response to receipt of the RCT message, the congested node sends another TFC message to the originating node. If the originating node receives no further TFC messages after having sent the RCT message, indicating abatement of the congestion condition, the originating node updates its routing table with the next lower congestion status (e.g., "n−1"), and repeats the procedure until the congestion status equals zero.

A particular concern is that the congestion detection mechanism in a conventional SS7 signaling network node determines congestion solely based on buffer occupancy of the outbound link. In particular, the congested node receives signaling messages (e.g., MSUs) from many different originating nodes, and signaling messages received from originating nodes after the onset of congestion cause the congested node to send TFCs back to those originating nodes. However, the onset of congestion may be due to a relatively large amount of traffic from a small group of the originating nodes, or possibly a single originating node sending a substantially large amount of MSUs over a prescribed interval (e.g., 40-60 MSUs per second).

Hence, the output of TFCs to all the originating nodes, regardless of the source of the congestion condition, may unfairly penalize originating nodes that did not contribute to the congestion condition. In addition, the transmission of TFCs to originating nodes that did not contribute to the congestion condition further wastes bandwidth resources on the signaling links.

SUMMARY OF THE INVENTION

There is a need for an arrangement that enables a signaling network node encountering congestion conditions on an outbound link queue to control transmission of signaling messages by identification and control of selected originating nodes determined to have created the congestion condition.

There also is a need for an arrangement that enables a signaling network node to control bandwidth reservation for an outbound link by controlling transmission of signaling messages by selected originating nodes according to determined attributes of the signaling messages.

These and other needs are attained by the present invention, where a signaling network node is configured for identifying a received signaling message as belonging to one of a plurality of prescribed originating node groups, based on prescribed message class selection criteria. Each originating node group has at least one originating node and is assigned at least one congestion threshold relative to a message rate (e.g., messages per unit time or number of bytes per unit time). The signaling network node determines the message rate for each corresponding originating node group; if the message rate for an originating node group exceeds the corresponding at least one congestion threshold, the signaling network node outputs a congestion signaling message to the originating node having sent the signaling message, for reduction of the corresponding message rate.

Hence, a signaling network node can control transmission of messages by originating nodes based on user-selected message class selection criteria, enabling the signaling network node to minimize congestion by the originating nodes having caused congestion conditions. In addition, the control of message transmission by originating nodes based on user-selected message class selection criteria enables a user to reserve link bandwidth for different originating node groups, enabling implementation of more precise and more flexible network traffic engineering policies.

One aspect of the present invention provides a signaling network node having a table and a processor. The table is configured for storing originating node group entries identifying respective originating node groups. Each originating node group includes at least one originating node configured for supplying a signaling message via a signaling network. The processor is configured for identifying a received signaling message as belonging to one of the originating node groups based on prescribed message class selection criteria. The processor is configured for determining for the one originating node group a message rate based on the received signaling message. The processor further is configured for selectively executing a congestion control operation for the one originating node group, based on the message rate exceeding a prescribed congestion threshold for the corresponding one originating node group.

Hence, the identification of a signaling message as belonging to one originating node group enables a signaling network node to selectively control specific nodes from dominating the signaling network, especially in situations involving unauthorized traffic (e.g., spamming). Moreover, overall network congestion can be minimized by maintaining lower congestion thresholds for lower priority traffic.

Another aspect of the present invention provides a method in a signaling network node. The method includes storing originating node group entries identifying respective originating node groups in a table. Each originating node group entry includes at least one originating node configured for supplying a signaling message via a signaling network. The method also includes identifying a received signaling message as belonging to one of the originating node groups based on prescribed message class selection criteria, and determining for the one originating node group a message rate based on the received signaling message. The signaling network node selectively executes a congestion control operation for the one originating node group based on the message rate exceeding a prescribed congestion threshold for the corresponding one originating node group.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a diagram illustrating different classification methods that may be used by the processor of FIG. 2 in classifying a received signaling message as belonging to an originating node group, according to an embodiment of the present invention.

FIG. 4 is a diagram illustrating in detail the table of FIG. 2 having node group entries specifying member originating nodes, according to an embodiment of the present invention.

BEST MODE FOR CARRYING OUT THE INVENTION

Figure 1:
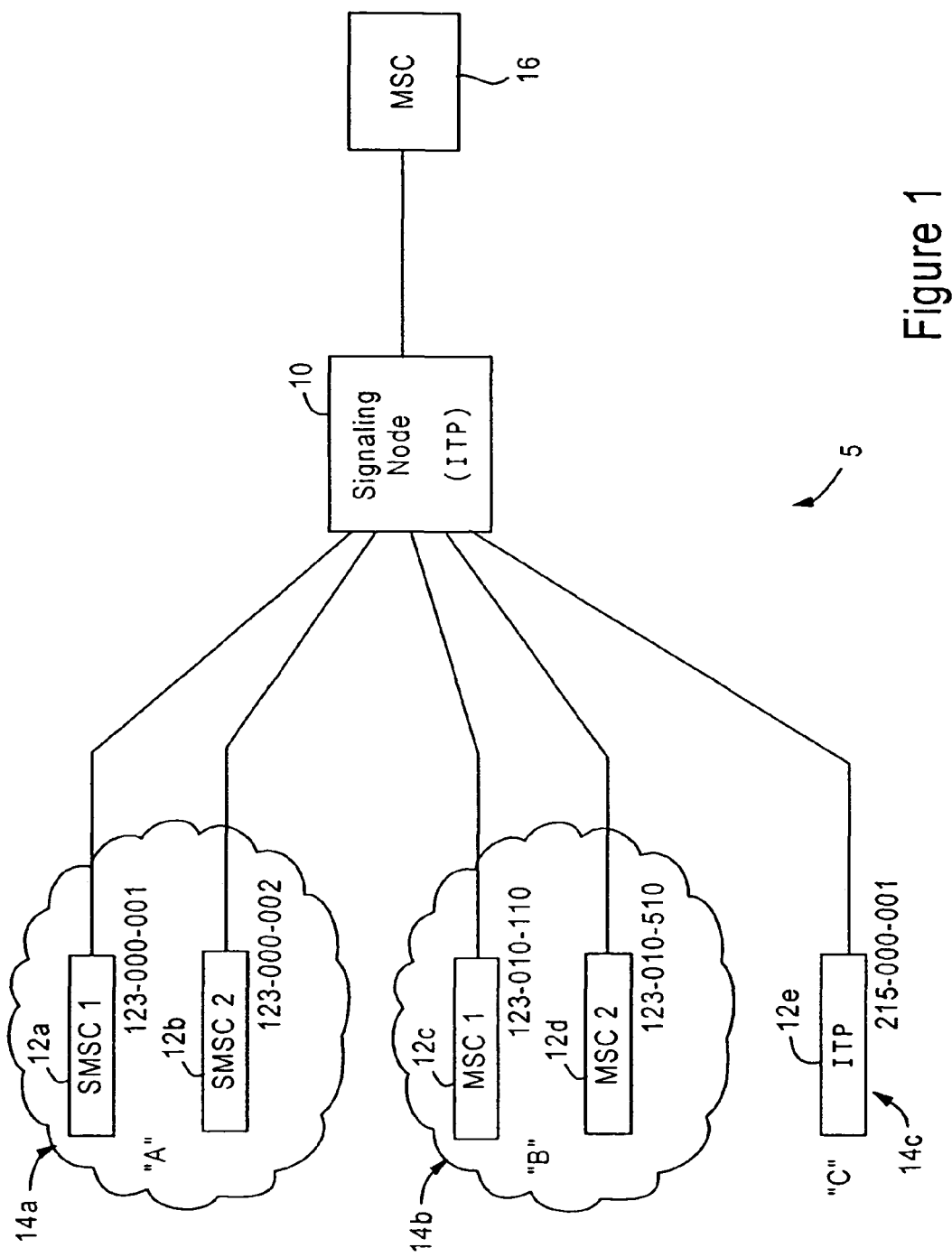
FIG. 1 is a block diagram illustrating an SS7 signaling network having a signaling network node configured for controlling bandwidth utilization by originating nodes based on classifying a received signaling message to an originating node group, according to an embodiment of the present invention.

FIG. 1 is a block diagram illustrating an SS7 signaling network 5 having an SS7 signaling node 10 configured for enforcing user-selected bandwidth policies based on controlling traffic from originating node groups, according to an embodiment of the present invention. The SS7 signaling node 10, implemented for example as a signaling transfer point in a public switched telephone network, is configured for enforcing bandwidth allocation policies, established by a user, for existing PSTN based SS7 networks (e.g., frame relay based SS7 networks), as well as Internet Protocol (IP) based SS7 networks. Hence, the signaling network node 10 may be implemented as an SS7 network node that relies upon transport of Message Transfer Part (MTP) 3 messages across an IP-based network providing a guaranteed quality of service; such guaranteed quality of service can be provided in an IP based network based on setting prescribed values to type of service (TOS) fields within the IP headers. An exemplary signaling network node 10 is the commercially available Cisco IP Transfer Point (ITP) from Cisco Systems, Inc., San Jose, Calif.

Regardless of whether the signaling network node 10 is implemented in a conventional PSTN based SS7 network utilizing, for example, frame relay, or an IP based SS7 network, the disclosed signaling network node 10 is configured for providing quality of service based switching of network traffic, enabling implementation of user specified bandwidth reservation for signaling links. In particular, assume that the signaling node 10 receives SS7 signaling messages from other SS7 signaling nodes 12, referred to herein as originating nodes 12. Different originating nodes may send different types of signaling messages; for example, the SMSC 12a and 12b may send SMS messages for delivery to destination mobile terminals via the signaling node 10 and a destination signaling node 16. Alternately, service switching points (illustrated as MSC 12c and an MSC 12d) may send ISUP call setup messages for setup and teardown of calls. Certain signaling nodes, such as the ITP 12e, also may send other signaling messages such as SCCP traffic for TCAP based services.

As apparent from the foregoing, there is a need to differentiate between originating nodes that may contribute to a congestion condition in the signaling network node 10; moreover, there is a need to be able to control the originating nodes in a manner that enables bandwidth to be assigned based on desired user policies.

According to the disclosed embodiment, the signaling network node 10 is able to classify received signaling messages into message classes according to prescribed message class selection criteria, described below. Each message class corresponds to a unique signaling message attribute having a corresponding unique user policy. Hence, the signaling network node 10, upon classifying the received signaling message as belonging to one of the message classes, can process the received signaling message according to the user policies specified for that one message class.

In particular, the disclosed embodiment specifies message classes in terms of originating node groups 14, where each originating node group 14 has at least one originating node 12 assigned as a member; for example, the originating node group 14a that sends SMS-based messages includes the SMSC 12a and the SMSC 12b; the originating node group 14b that may send ISUP messages includes the MSC 12c and 12d; and the originating node group 14c that may send TCAP query messages includes the ITP 12e. As described below with respect to FIGS. 4, 5, and 6, each originating node group 14 has a corresponding set of policies, implemented as congestion threshold, that enable the signaling network node 10 to control message traffic for each of the originating node groups 14.

Hence, the signaling network node 10 can identify signaling messages, for example ISUP, and SCCP traffic, as belonging to different originating node groups 14, and process the received signaling message according to the user policies established for the identified originating node group. Hence, if the signaling traffic from the originating node group 14a exceeds a prescribed congestion threshold, described below, the signaling network node 10 can initiate congestion control operations for the originating node group 14a, while concurrently continuing to route the signaling messages received from the originating node groups 14b and 14c to their destinations 16.

Figure 2:
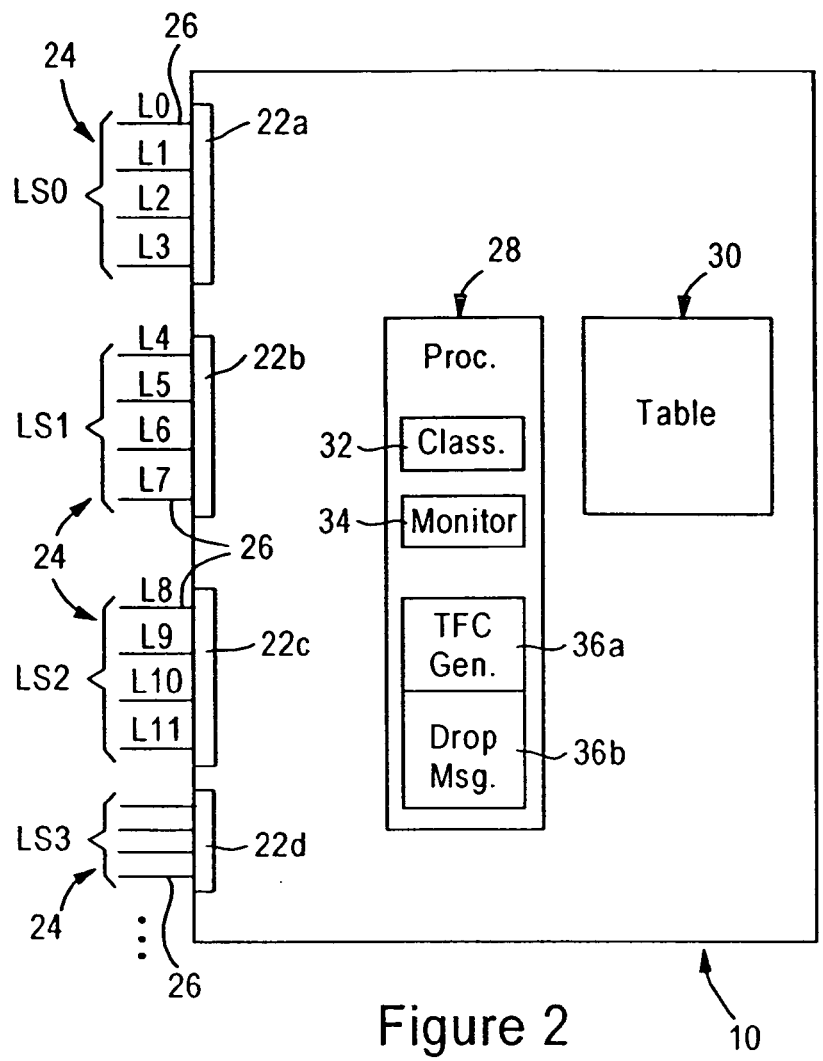
FIG. 2 is a block diagram illustrating the SS7 signaling network node of FIG. 1, configured for controlling bandwidth utilization, according to an embodiment of the present invention.

FIG. 2 is a diagram illustrating the signaling network node 10 of FIG. 1. The signaling network node 10 includes linkset interfaces 22 configured for sending and receiving signaling messages from respective input linksets (LS) 24; for example, the linkset interfaces 22a, 22b, 22c, and 22d are configured for receiving signaling messages from the input linksets LS0, LS1, LS2 and LS3, respectively. As recognized in the art, each linkset (LS) 24 typically is connected to another corresponding signaling node within the SS7 network. Each linkset (LS) 24 has at least one assigned signaling link 26 that uniquely identifies that link (e.g., L0) relative to other links within the given linkset. Hence, the links 26 are grouped in prescribed linksets 24 having respective linksets identifiers (e.g., LS0). As illustrated in FIG. 1, the links L0, L1, L2, and L3 are grouped and assigned to linkset LS0, the links L4, L5, L6 and L7 are assigned to linkset LS1, the links L8, L9, L0 and L11 are assigned to linkset LS2, etc.

The signaling network node 10 also includes a processor 28 configured for controlling routing of the network traffic, and a table 30 configured for storing the originating node group entries identifying the originating node groups 14. The table 30, illustrated in detail in FIG. 4, may be part of the conventional routing table (not shown) used to determine destination linksets based on destination point code lookup, or the table 30 may be distinct from the routing table.

The processor 28 includes a classification resource 32, implemented for example as executable code, configured for identifying the received signaling message as belonging to one of the originating node groups 14 based on prescribed message class selection criteria, illustrated in FIG. 3. The processor 28 also includes a monitoring resource 34 configured for determining the message rate for the one originating node group 14 having sent the received signaling message. For example, all the signaling messages sent by the members 12a and/or 12b of the originating node group 14a are used to determine the message rate for originating node group 14a, regardless of the individual member that actually transmitted the signaling message. The monitoring resource 34 compares the message rate, measured for example in messages per second, bits per second, etc., to prescribed congestion thresholds for the corresponding originating node group 14.

If the monitoring resource 34 determines that the message rate for the originating node group 14 exceeds the selected congestion thresholds for originating node group 14, the processor 28 executes congestion control operations 36. In particular, the processor 28 includes a Transfer Controlled (TFC) generation resource 36a configured for selectively sending a TFC message to each of the originating nodes 12 of the affected originating node group 14 sending a signaling message, based on user selection preferences. The processor 28 also includes a drop message resource 36b configured for selectively dropping the received signaling message to avoid further congestion on an outbound link, based on user selection preferences. Hence, depending on user selection preferences and the thresholds having been exceeded by the message rate, the processor 28 may: allow the signaling messages from the originating node group (e.g., 14a) exceeding a congestion threshold to pass to the destination signaling device, and send a TFC signaling message to the originating node (e.g., 12a); drop all signaling messages from the relevant originating node group (e.g., 14a) without sending a TFC signaling message, for example relying on other traffic management procedures such as retransmission of unacknowledged packets to manage congestion; or drop all signaling messages from the originating node group (e.g., 14a) exceeding the congestion threshold and send a TFC signaling message to each member of the originating node group having sent a signaling message.

Concurrently with the execution of the congestion control operations 36 by the processor 28 for the affected originating node group (e.g., 14a), the processor 28 also may allow the signaling traffic for the remaining originating node groups (e.g., 14b and 14c) to continue without congestion control operations, based on the remaining originating node groups having message rates below their respective congestion thresholds.

Hence, the disclosed embodiment enables a user to precisely control input link bandwidth, or output link bandwidth, by establishing node groups for control of signaling traffic to or from multiple signaling nodes.

FIG. 3 is a diagram illustrating some of the different classification methods available to the classification resource 32 in classifying received packets. Typically any one or all of the following classification methods may be loaded into the processor 18 for execution, and selected by an administrator: originating point code (OPC) classification 38a, destination point code (DPC) classification 38b, service indicator (SI) classification 38c, subsystem number (SSN) classification 38d, calling party address (e.g., telephone number) classification 38e, called party address (e.g., telephone number) classification 38f, selected MTP-3 Field value classification 38g, SCCP classification based on a GTT selector table entry 38h, SCCP classification based on a GTA translation table entry 38i, or a user-selected bit pattern classification 38j.

Execution of anyone of the classification methods 38 by the classification resource 32 within the processor 18 causes the received signaling messages to be classified (i.e., identified as belonging to one of the originating node groups) based on the corresponding data specified in the received signaling message. For example, the service indicator classification method 38c enables the processor 18 to classify packets based on the service indicator (SI) field in the SS7 signaling message. In particular, all MTP-3 headers include a 4-bit service indicator (SI) value within the service information octet (SIO) that uniquely identifies that type of MTP-3 message. Hence, the service indicator field, used to describe the type of packet (e.g., Signaling Network Management Message (SNM), Maintenance Regular Message (MTN), Maintenance Special Message (MTNS), Signaling Connection Control Part (SCCP), Telephone User Part (TUP), ISDN User Part (ISUP) etc.), can be used to map the received signaling message to a corresponding class. Use of the service indicator classification method 38c by the processor 18 requires less processing resources than the logic based classification methods, such as the user-selected bit pattern classification method 38*j*.

The SCCP based classification methods 38*h* and 38*i* classify packets based on global title translation (GTT) as specified by SS7. In particular, GTT provides a database of translation types, typically telephone numbers, that map to a destination point code; hence, the processor 18 may use the GTT classification method 38*h* to classify the received signaling messaging during mapping of the translation type, where the GTT database includes an extra field for the classification identifier. A similar method 38*i* may be set up for the global title address (GTA) translation, where an extra class identifier field in the GTA translation table enables the processor 8 to identify the corresponding assigned class.

Hence, the classification resource 32 may utilize selected fields of the received signaling message, or any portion of the received signaling message (including noncontiguous bit patterns), to classify the received signaling message as belonging to one of the originating node group 14. Once the originating node group has been identified, the received signaling message is used to determine the corresponding message rate for the identified originating node group. Additional details relating to packet classification can be obtained from commonly-assigned, copending application Ser. No. 10/022,443, filed Dec. 20, 2001, entitled Arrangement for Routing a Received SS7 Signaling Message Based on Packet Classification, the disclosure of which is incorporated in its entirety herein by reference.

FIG. 4 is a diagram illustrating in further detail the table 30 of FIG. 1 according to an embodiment of the present invention. The table 30 includes originating node group entries 40 that identify originating node groups 14. For example, the originating node group entries 40*a*, 40*b*, and 40*c* identify the originating node groups 14*a* ("A"), 14*b* ("B"), and 14*c* ("C"), respectively. Each originating node group entry 40 is configured for storing at least originating point code (OPC) entry 42 that identifies a corresponding originating node 12 having been identified as belonging to the corresponding originating node group following the onset of congestion. In particular, when an MSU is classified into a particular node group 14, and the congestion onset threshold has been reached or exceeded for the corresponding group 14, a TFC is sent to the OPC of the received MSU; the OPC is concurrently saved in the OPC entry 42 for responding to subsequent routeset congestion test (RCT) messages, described below. The OPC entries 42 for a given group are discarded when the corresponding abatement threshold is reached. If desired, the OPC entries 42 may be stored in a cache (grouped according to the congested node group) that is separate from the table 30.

Each originating node group entry 40 is configured for specifying a message class key 44, and a plurality of congestion threshold values 46 and congestion abatement values 48. The message class key 44 is a unique identifier enabling the processor 28 to uniquely identify the each node group 14 based on the prescribed message class selection criteria selected by the user. For example, the message class key 44 may be a range of originating point code values, as illustrated in FIG. 4, or may be a hash key generated based on the associated values for the user selected message class selection criteria. Hence, the processor 28 utilizes the message class selection criteria for determining for a received signaling message the originating node group 14 having sent the received signaling message, based on a match between the message class selection criteria and the message class key 44 of one of the originating node group entries 40.

The congestion threshold values 46 and congestion abatement values 48 specify congestion threshold values for respective priority levels that may be specified within the received signaling message. The table 30 illustrated in FIG. 4 assumes use of two priority levels for establishment of congestion threshold, illustrated in FIG. 5.

Figure 5:
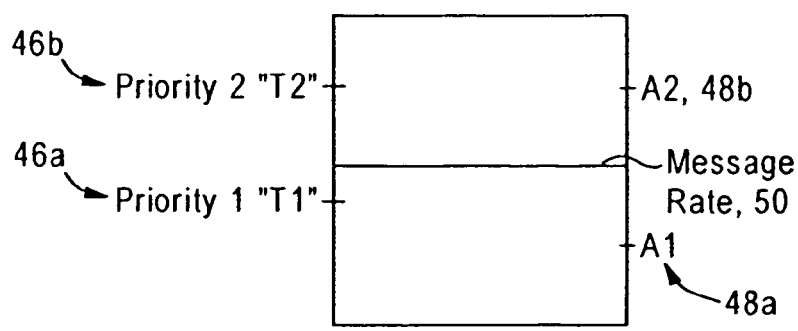
FIG. 5 is a diagram illustrating multiple congestion threshold levels assigned to an originating node group entry.

As illustrated in FIG. 5, each originating node group entry 40 specifies first and second priority congestion thresholds 46*a* and 46*b* for first and second priority signaling messages from the corresponding originating node group 14, respectively. Hence, if the monitoring resource 34 determines that the message rate 50 for a given originating node group (e.g., 14*a*) exceeds the priority 1 threshold ("T1") 46*a* but not the priority 2 threshold ("T2"), the processor 28 may continue to pass signaling messages from the given originating node group (e.g., 14*a*) that specify a level 2 priority, and may drop signaling messages from the given originating node group that specify a level 1 priority (where level 2 priority is deemed a higher priority than level 1 priority). If the monitoring resource 34 determines that the message rate 50 for the given originating node group exceeds the priority 2 threshold ("T2"), the processor 28 may then drop signaling messages from the given originating node group that specify the level 2 priority.

The abatement thresholds 48*b* and 48*a* illustrated in FIG. 5 specify the message rate reduction necessary to terminate the congestion control operations initiated based on the message rate 50 reaching the congestion threshold levels 46*b* and 46*a*, respectively.

Hence, the signaling network node 10 can precisely control the network traffic having different priority levels from each of the originating node groups 14 to prescribed bandwidth reservation policies specified by prescribed congestion thresholds.

Figure 6:
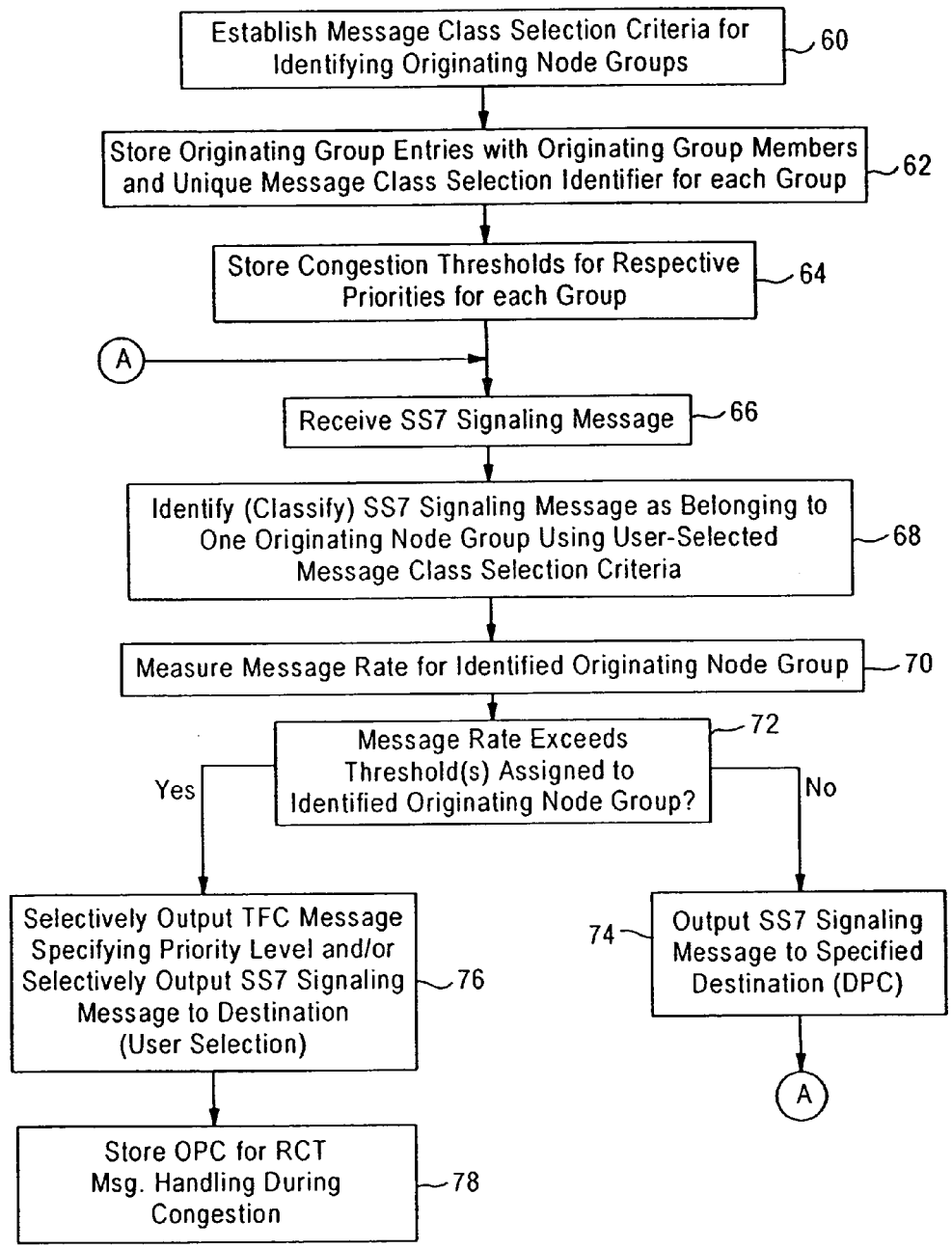
FIG. 6 is a diagram illustrating the method by the SS7 signaling network node of FIG. 2 of controlling bandwidth utilization using congestion control operations, according to an embodiment of the present invention.

FIG. 6 is a diagram illustrating the method of controlling signaling traffic based on classification of received signaling messages to originating node group entries, according to an embodiment of the present invention. The steps described in FIG. 6 can be implemented as executable code stored on a computer readable medium (e.g., a hard disk drive, a floppy drive, a random access memory, a read only memory, an EPROM, a flash memory, a compact disk, etc.).

The method begins in step 60, where the administrator of the signaling network node 10 establishes message class selection criteria, from the available classification methods 38, for identifying the originating node groups 14. The network administrator then stores in step 62 the originating group entries 40 and unique message class selection identifiers 44 for each group. The network administrator then stores in step 64 the congestion thresholds 46 and abatement thresholds 48 for the respective priorities for each group in the corresponding originating node group entry 40.

Once the table 30 has been populated with the originating node group information including identification, and user policies specified by prescribed congestion threshold, and once the network administrator has selected the classification methods 38 to be used by the classification resource 32, the signaling network node 10 is ready to begin enforcing the network traffic policies.

In particular, in response to receiving in step 66 an SS7 signaling message, the classification resource 32 of the processor 28 identifies (i.e., classifies) the received signaling message in step 68 as belonging to one of the originating node groups 14 using the user-selected message class selection criteria 38. The monitoring resource 34 measures in step 70 the message rate for the identified originating node group, for example by incrementing a counter configured for maintaining a running average of number of messages received per second for the corresponding originating node group 14. In this case, the monitoring resource 34 would maintain, for each originating node group 14, a corresponding counter for continued monitoring of the corresponding message rate.

If in step 72 the processor 28 determines that the message rate for the identified originating node group (e.g., 14a) does not exceed any of the thresholds 46 assigned to the identified originating node group, the processor 28 outputs in step 74 the received signaling message to the specified destination using conventional DPC routing tables.

However if in step 72 the processor 28 determines that the message rate 50 for the identified originating node group exceeds at least one of the thresholds 46 assigned to the identified originating node group (e.g., 14a), the processor 28 selectively executes in step 76 congestion control operations 36 for the identified originating node group, based on the user preferences established by the network administrator. As described above, the congestion control operations may include sending a TFC message to the originating node of the identified originating node group using the resource 36a, dropping the received signaling message based on the resource 36b, or both. Other traffic management procedures also may be utilized by the network administrator, for example responding to alarms, SNMP traps, etc. The OPC of the received signaling message is stored in the originating node entry 42 in step 78.

As apparent from the foregoing, transmission of a TFC message to the originator of the signaling message (based on the OPC in the received signaling message) of the identified originating node group (e.g., 14a) causes the originating node in the identified originating node group 14 to start a routeset congestion test procedure, where the originating node sends routeset congestion test (RCT) messages periodically to the concerned destination, according to SS7 protocol. Since RCT messages do not necessarily include the fields needed to classify the message, the processor 28 compares the OPC of the received RCT message to the stored OPC values in the OPC entries 42 to determine if the RCT is from a congested group. As described above, the OPC values for groups in congestion are stored in the OPC entries; hence, if the OPC of the received RCT message is found among the OPC entries 42, the group is still in congestion and another TFC is returned. If the OPC is not found, then standard SS7 actions are taken.

According to the disclosed embodiment, network nodes can be selectively controlled to minimize, or even to preempt, link congestion by selectively executing congestion control operations for network nodes identified as creating congestion conditions, without adversely affecting transport of signaling message from other network nodes. Moreover, link congestion can be preempted by controlling traffic from less important nodes having a lower priority, whereas more important traffic having a higher priority (as selected by a network administrator) can continue to flow unaffected.

As apparent from the foregoing, numerous alternative classification methods and prioritization schemes may be utilized, depending on implementation and/or user preference. In addition, different table implementations may be used for indexing and accessing information for messages having respective class types.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A signaling network node comprising:
signaling link network interfaces, each configured for receiving a signaling packet from a corresponding signaling node of a signaling network; and
a processor configured for classifying each received signaling packet as belonging to one of a plurality of groups of the signaling nodes of the signaling network based on prescribed message class selection criteria, each group of signaling nodes including at least one signaling node and at least a first of the group of signaling nodes including a plurality of the signaling nodes of the signaling network, the processor configured for determining a corresponding message rate for each group of signaling nodes, relative to a unit time, based on the corresponding received signaling packet classified as belonging to the corresponding group of signaling nodes;
the processor further configured for executing a congestion control operation for any one group of signaling nodes if the corresponding message rate for the one group of signaling nodes exceeds a corresponding predetermined threshold for the one group of signaling nodes.

2. The node of claim 1, wherein each network interface is configured for receiving each received signaling packet according to SS7 protocol, the processor configured for classifying the received signaling packet as belonging to the one group of signaling nodes based on applying the prescribed message class selection criteria including at least any one of an originating point code, a destination point code, a service indicator, a subsystem number, a calling party address, a called party address, a prescribed Message Transfer Part (MTP)-3 field value, a prescribed Signaling Connection Control Part (SCCP) field value, or a prescribed bit pattern at a corresponding prescribed location within the received signaling packet.

3. The node of claim 1, wherein the processor is configured for selectively executing at least one of a plurality of the congestion control operations, based on user preference.

4. The node of claim 3, wherein the congestion control operations include dropping the received signaling packet, and outputting a congestion message to the originating node from the one originating node group and having sent the received signaling packet.

5. The node of claim 4, wherein each originating node group is assigned a plurality of the prescribed thresholds for successive priority levels, the processor configured for specifying, within the congestion message, the priority level corresponding to the prescribed threshold having been exceeded by the message rate.

6. The node of claim 5, wherein the processor is configured for selectively outputting the received signaling packet to a specified destination based on the message rate relative to the prescribed thresholds, and based on a user preference.

7. The node of claim 4, wherein the processor is configured for concurrently outputting the received signaling packet to a specified destination and outputting the congestion message to the originating node having sent the received signaling packet, based on a user preference.

8. The node of claim 4, wherein the processor is configured for outputting the congestion message as a Transfer Controlled (TFC) message.

9. The node of claim 1, wherein at least a first of the group of signaling nodes includes a plurality of signaling nodes.

10. A method in a signaling network node, including:
determining a message rate, relative to a unit time, for one of a plurality of groups of signaling nodes of a signaling network based on classifying a signaling packet, received via a signaling network link from one of the signaling nodes, as belonging to the one group of signaling nodes based on prescribed message class selection criteria, each group of signaling nodes including at least one signaling node and at least a first of the group of signaling nodes including a plurality of the signaling nodes of the signaling network, each of the signaling nodes coupled to the signaling network node via a corresponding signaling network link; and executing a congestion control operation for the one group of signaling nodes if the message rate for the one group of signaling nodes exceeds a predetermined threshold for the one group of signaling nodes.

11. The method of claim 10, further comprising receiving the signaling packet according to SS7 protocol, the classifying of the signaling packet including using, as the prescribed message class selection criteria, at least any one of an originating point code, a destination point code, a service indicator, a subsystem number, a calling party address, a called party address, a prescribed Message Transfer Part (MTP)-3 field value, a prescribed Signaling Connection Control Part (SCCP) field value, or a prescribed bit pattern at a corresponding prescribed location within the received signaling packet.

12. The method of claim 10, wherein the executing includes selectively executing at least one of a plurality of available congestion control operations, based on user preference.

13. The method of claim 12, wherein the available congestion control operations include dropping the received signaling packet, and outputting a congestion message to the originating node from the one originating node group and having sent the received signaling packet.

14. The method of claim 13, further comprising specifying, within the congestion message, a priority level corresponding to one of a plurality of predetermined threshold having been exceeded by the message rate.

15. The method of claim 14, wherein the executing includes selectively outputting the received signaling packet to a specified destination based on the message rate relative to the prescribed thresholds, and based on a user preference.

16. The method of claim 13, wherein the executing includes concurrently outputting the received signaling packet to a specified destination and outputting the congestion message to the originating node having sent the received signaling packet, based on a user preference.

17. The method of claim 13, wherein the selectively executing step includes outputting the congestion message as a Transfer Controlled (TFC) message.

18. The method of claim 10, wherein at least a first of the group of signaling nodes includes a plurality of signaling nodes.

19. A non-transitory computer readable medium having stored thereon sequences of instructions for selectively routing a received signaling packet by a signaling network node via a signaling network, the sequences of instructions including instructions for performing the steps of:

determining a message rate, relative to a unit time, for one of a plurality of groups of signaling nodes of a signaling network based on classifying a signaling packet, received via a signaling network link from one of the signaling nodes, as belonging to the one group of signaling nodes based on prescribed message class selection criteria, each group of signaling nodes including at least one signaling node and at least a first of the group of signaling nodes including a plurality of the signaling nodes of the signaling network, each of the signaling nodes coupled to the signaling network node via a corresponding signaling network link; and executing a congestion control operation for the one group of signaling nodes if the message rate for the one group of signaling nodes exceeds a predetermined threshold for the one group of signaling nodes.

20. The medium of claim 18, further comprising instructions for receiving the signaling packet according to SS7 protocol, the classifying of the signaling packet including using, as the prescribed message class selection criteria, at least any one of an originating point code, a destination point code, a service indicator, a subsystem number, a calling party address, a called party address, a prescribed Message Transfer Part (MTP)-3 field value, a prescribed Signaling Connection Control Part (SCCP) field value, or a prescribed bit pattern at a corresponding prescribed location within the received signaling packet.

21. The medium of claim 19, wherein the executing includes selectively executing at least one of a plurality of available congestion control operations, based on user preference.

22. The medium of claim 21, wherein the available congestion control operations include dropping the received signaling packet, and outputting a congestion message to the originating node from the one originating node group and having sent the received signaling packet.

23. The medium of claim 22, further comprising instructions for specifying, within the congestion message, a priority level corresponding to one of a plurality of predetermined threshold having been exceeded by the message rate.

24. The medium of claim 23, wherein the executing includes selectively outputting the received signaling packet to a specified destination based on the message rate relative to the prescribed thresholds, and based on a user preference.

25. The medium of claim 22, wherein the executing includes concurrently outputting the received signaling packet to a specified destination and outputting the congestion message to the originating node having sent the received signaling packet, based on a user preference.

26. The medium of claim 22, wherein the selectively executing includes outputting the congestion message as a Transfer Controlled (TFC) message.

27. The medium of claim 19, wherein at least a first of the group of signaling nodes includes a plurality of signaling nodes.

28. A signaling network node comprising:

signaling link interfaces, each configured for establishing a signaling link with a corresponding signaling node in a signaling network;

means for determining a message rate, relative to a unit time, for one of a plurality of groups of the signaling nodes of the signaling network based on classifying a signaling packet, received via one of the signaling network links from one of the signaling nodes, as belonging to the one group of signaling nodes based on prescribed message class selection criteria, each group of signaling nodes including at least one signaling node and at least a first of the group of signaling nodes including a plurality of the signaling nodes of the signaling network; and means for executing a congestion control operation for the one group of signaling nodes if the message rate for the one group of signaling nodes exceeds a predetermined threshold for the one group of signaling nodes.

29. The node of claim 28, wherein each signaling link interface is configured for receiving a signaling packet according to SS7 protocol, the means for determining configured for classifying the signaling packet using, as the prescribed message class selection criteria, at least any one of an originating point code, a destination point code, a service indicator, a subsystem number, a calling party address, a called party address, a prescribed Message Transfer Part (MTP)-3 field value, a prescribed Signaling Connection Control Part (SCCP) field value, or a prescribed bit pattern at a corresponding prescribed location within the received signaling packet.

30. The node of claim 28, wherein the means for executing is configured for selectively executing at least one of a plurality of available congestion control operations, based on user preference.

31. The node of claim 30, wherein the available congestion control operations include dropping the received signaling packet, and outputting a congestion message to the originating node from the one originating node group and having sent the received signaling packet.

32. The node of claim 31, wherein the means for executing is configured for specifying, within the congestion message, a priority level corresponding to one of a plurality of predetermined threshold having been exceeded by the message rate.

33. The node of claim 32, wherein the means for executing is configured for selectively outputting the received signaling packet to a specified destination based on the message rate relative to the prescribed thresholds, and based on a user preference.

34. The node of claim 33, wherein the means for executing is configured for selectively outputting the received signaling packet to the specified destination based on a specified priority within the received signaling packet relative to the prescribed threshold having been exceeded by the message rate, and based on the user preference.

35. The node of claim 31, wherein the means for executing is configured for outputting the congestion message as a Transfer Controlled (TFC) message.

36. The node of claim 28, wherein at least a first of the group of signaling nodes includes a plurality of signaling nodes.

* * * * *